United States Patent [19]
Fahl

[11] Patent Number: 4,618,171
[45] Date of Patent: Oct. 21, 1986

[54] QUICK CONNECT-DISCONNECT COUPLING

[75] Inventor: Richard L. Fahl, Cincinnati, Ohio

[73] Assignee: Dover Corporation, Cincinnati, Ohio

[21] Appl. No.: 524,739

[22] Filed: Aug. 18, 1983

[51] Int. Cl.⁴ ............................................. F16L 35/00
[52] U.S. Cl. ...................................... 285/93; 285/312; 29/428
[58] Field of Search ................ 285/312, DIG. 25, 93, 285/DIG. 11; 29/428

[56] References Cited

U.S. PATENT DOCUMENTS

| 2,478,586 | 8/1949 | Krapp | 285/312 |
| 2,518,026 | 8/1950 | Krapp | 285/312 |
| 4,519,635 | 5/1985 | McMath | 285/312 X |

Primary Examiner—Dave W. Arola
Attorney, Agent, or Firm—Kinney and Schenk

[57] ABSTRACT

A quick connect-disconnect coupling for a fluid conduit structure and method of making same are provided wherein the conduit structure has cam devices for connecting and disconnecting a coupler member and an adapter member comprising the coupling and the cam devices cooperate during disconnection of the members to provide a disconnecting movement from a first axial position thereof until a second position is reached at which second axial position the disconnecting movement is reversed and becomes an incremental connecting movement for a predetermined increment to a third axial position of the members before allowing the members to be completely disconnected, the coupling having seal means that provides a fluid-tight seal between the members during the entire time the members are being moved from the first axial position thereof to the third axial position thereof.

20 Claims, 10 Drawing Figures

QUICK CONNECT-DISCONNECT COUPLING

BACKGROUND OF THE INVENTION

1. Field of the Invention

This invention relates to couplings and in particular to quick connect-disconnect couplings for fluid conduit means such as fluid conduits, fluid containers, vent pipes, and structures associated with these items, as well as to a method of making such couplings.

2. Prior Art Statement

It is at least known to applicant to provide a quick connect-disconnect coupling for fluid conduit means comprising a coupler member adapter to be connected in such conduit means and having a first tubular outer end and a first sealing surface, an adapter member adapted to be connected in the conduit means and having a second tubular outer end and a second sealing surface with the second tubular end being adapted to be received within the first tubular end, cam means for connecting and disconnecting the members comprising first cam means operatively associated with the first tubular end and second cam means operatively associated with the second tubular end, and seal means disposed between the sealing surfaces for providing a fluid-tight seal between the members with the cam means connected and the members in a first axial position thereof. The first and second cam means cooperate during disconnection of the members to provide an axial disconnecting movement from the first axial position thereof until a second axial position thereof is reached at which second axial position the disconnecting movement of the memebers is reversed and becomes an incremental axial connecting movement for a predetermined increment to a third axial position of the members before allowing the members to be completely disconnected and in the event fluid under pressure is present in the conduit means having the members connected therein the incremental connecting movement of the cam means is subjected to resistance by the fluid under pressure, the resistance being transmitted through the cam means as an opposing force which serves to impede the incremental movement by resisting any opening force applied to the cam means, the opposing force being detectable and once detected serves as a warning that the pressure of the fluid under pressure must be relieved before completely disconnecting the members.

For example, see the copending patent application of Jack A. McMath, Ser. No. 428,164, filed Sept. 29, 1982 and now U.S. Pat. No. 4,519,635.

SUMMARY OF THE INVENTION

It is one feature of this invention to provide an improved quick connect-disconnect coupling for fluid conduit means.

In particular, it was found according to the teachings of this invention that the prior known quick connect-disconnect coupling permitted the fluid therein to leak therefrom when fluid under pressure is present in the conduit means having the prior known coupling members connected therein and when the incremental connecting movement of the cam means thereof is subjected to resistance by the fluid under pressure even though the operator has operated the cam means in a manner to detect that fluid is still in the system and must be relieved before completely disconnecting the members as set forth in the aforementioned copending patent application, Ser. No. 428,164, filed Sept. 29, 1982.

Accordingly, it was also found according to the teachings of this invention that the seal means and sealing surfaces of the coupler member and the adapter member, as well as the cam means, of the coupling of the prior known type can be uniquely modified to maintain a fluid-tight seal between the coupler member and the adapter member during the entire time the cam means thereof are being operated in a manner to detect whether fluid under pressure is still present in the conduit system utilizing such coupling before the members are completely disconnected by the cam means. In this manner, no adverse fluid leakage can occur.

For example, one embodiment of this invention provides a quick connect-disconnect coupling for fluid conduit means comprising, a coupler member adapted to be connected in the conduit means and having a first tubular outer end and a first sealing surface, an adapter member adapted to be connected in the conduit means and having a second tubular outer end and a second tubular surface, the second tubular end being adapted to be received within the first tubular end, cam means for connecting and disconnecting the members comprising first cam means operatively associated with the first tubular end and second cam means operatively associated with the second tubular end, and seal means disposed between the sealing surfaces for providing a fluid-tight seal between the members with the cam means connected and the members in a first axial position thereof. The first and second cam means cooperate during disconnecting of the members to provide an axial disconnecting movement from the first axial position thereof until a second axial position thereof is reached at which second axial position the disconnecting movement of the members is reversed and becomes an incremental axial connecting movement for a predetermined increment to a third axial position of the members before allowing the members to be completely disconnected, and in the event fluid under pressure is present in the conduit means having the members connected therein, the incremental connecting movement of the cam means is subjected to resistance by the fluid under pressure, the resistance being transmitted through the cam means as an opposing force which serves to impede the incremental movement by resisting any opening force applied to the cam means. The opposing force is detectable and once detected serves as a warning that the pressure of the fluid under pressure must be relieved before completely disconnecting the members. The seal means provides the fluid-tight seal between the members during the entire time the members are being moved from the first axial position thereof to the third axial position thereof.

Also, the cam means are so constructed and arranged that when the members of the coupling are in the second axial position thereof, the cam means cannot be vibrated to a further opening position thereof as will be apparent hereinafter.

Accordingly, it is an object of this invention to provide an improved quick connect-disconnect coupling having one or more of the novel features of this invention as set forth above or hereinafter shown or described.

Another object of this invention is to provide an improved method of making a quick connect-disconnect coupling, the method of this invention having one or more of the novel features of this invention as set forth above or hereinafter shown or described.

Other objects, uses and advantages of this invention are apparent from a reading of this description which proceeds with reference to the accompanying drawings forming a part thereof and wherein:

DETAILED DESCRIPTION OF THE PREFERRED EMBODIMENT

Figure 1:
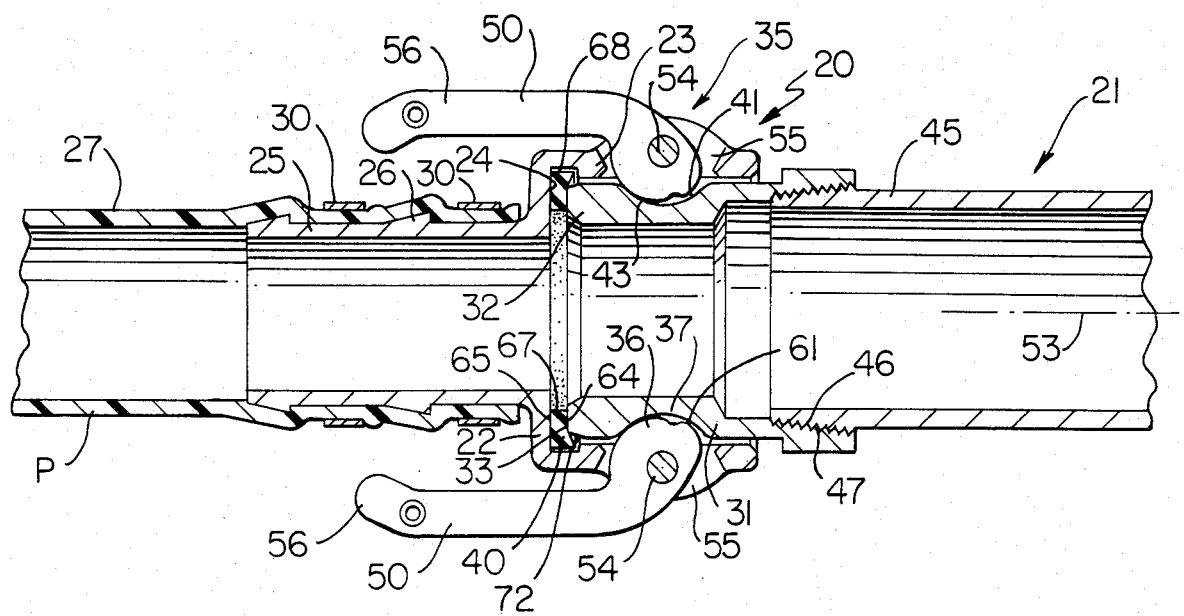
FIG. 1 is a fragmentary cross-sectional view of the improved quick connect-disconnect coupling of this invention being utilized in a fluid conduit means, the coupler member and the adapter member being in the fully connected position thereof.

While the various features of this invention are hereinafter illustrated and described as being particularly adapted to provide a quick connect-disconnect coupling for a particular conduit system, it is to be understood that the various features of this invention can be utilized singly or in various combinations thereof to provide a coupling for other systems as desired.

Therefore, this invention is not to be limited to only the embodiment illustrated in the drawings, because the drawings are merely utilized to illustrate one of the wide variety of uses of this invention.

Referring now to FIGS. 1-4, the quick connect-disconnect coupling of this invention is generally indicated by the reference numeral 20 and is particularly adapted to be utilized in a fluid conduit means or system that is generally indicated by the reference numeral 21 and which, in this example of the invention, is shown as a fluid conduit system for conveying a fluid which may be in the form of a gaseous fluid, a liquid, a combination of gas and liquid, a gas containing solid particles, a liquid containing solid materials (such as a slurry), or the like.

Since the conduit system 21 and the general operation of the coupling 20 of this invention is substantially the same as the conduit system and coupling illustrated, described and claimed in the aforementioned copending patent application, Ser. No. 428,164, filed Sept. 29, 1982, this copending patent application is being incorporated into this disclosure by this reference thereto.

However, in order to fully understand the improved features of this invention, sufficient details of the conduit system 21 and coupling 20 will be hereinafter described even though such description parallels the description set forth in the aforementioned copending patent application, Ser. No. 428,164, filed Sept. 29, 1982.

The coupling 20 comprises a coupler member 22 which is adapted to be connected in the conduit means or conduit system 21 and the coupler member 22 has a first tubular outer end in the form of an open outer end 23 and a first sealing surface shown as an annular sealing surface 24. The coupler member 22 may have an inner end portion of any suitable type known in the art and such inner end portion in this example comprises an inner end portion 25 having saw-toothed projections 26 extending from an outside surface thereof with the projections 26 being particularly adapted to receive a polymeric conduit 27, or the like, of the conduit system 21 thereover while being fastened in position by a plurality of spaced clamps 30.

The clamps 30 serve to urge the polymeric conduit 27 inwardly against the projections 26 so that the polymeric conduit 27 is fastened in position by the hose clamps 30 so that it follows the saw-toothed contour defined by the projections 26 whereby the conduit 27 is held firmly in position. The polymeric material of the conduit is indicated by the reference letter P and can be rubber reinforced with wire as is known in the art or can be any other suitable polymeric material, as desired.

The coupling 20 also comprises what will be referred to as an adapter member 31 which is also adapted to be connected in the conduit means or system 21 and the adapter member 31 has a second tubular outer end 32 and a second sealing surface 33. The second tubular end 32 is particularly adapted to be received concentrically within the first tubular end 23. The coupler member 22 with its tubular end 23 is often popularly referred to as a female coupler member while the adapter member 31 with its tubular end 32 is often popularly referred to as a male adapter member.

The coupling 20 also has cam means which is designated generally by the reference numeral 35 for connecting and disconnecting the coupler member 22 and adapter member 31. The cam means 35 comprises first cam means 36 operatively associated with the first tubular end 23 of the coupler member and second cam means 37 operatively associated with the second tubular end 32 of the adapter member 31.

The coupling 20 also has seal means in the form of a seal 40 which is disposed between the sealing surfaces 24 and 33; and, the seal 40 provides a fluid-tight sealing structure between the coupler member 22 and adapter member 31 with the cam means 35 connected as well as during certain opening movements of the cam means 36 as illustrated in FIGS. 5-9 and hereinafter described. The seal 40 in this example is shown by cross hatching as being made of rubber but could be made of any suitable material to operate in the manner hereinafter described.

In accordance with the teachings of this invention the first cam means 36 and second cam means 37 cooperate during disconnection of the members 22 and 31 to provide a disconnecting movement from a first axial position of the members 22 and 31 until a particular or second axial position is reached, and in a manner to be described in detail subsequently, at which second position the disconnecting movement is reversed and becomes an incremental movement for a predetermined increment to a third axial position before allowing the members to be completely disconnected. Further, as will also be described in detail subsequently, in the event fluid under pressure is present in the conduit means or system 21 having the members 22 and 31 connected therein the incremental connecting movement of the cam means 35 is subjected to resistance by the fluid under pressure with the resistance being transmitted through the cam means 35 as an opposing force which serves to impede the incremental movement by resisting any opening force applied to the cam means 35. The opposing force is detectable and once detected serves as a warning that the pressure of the fluid under pressure must be relieved before completely disconnecting the members 22 and 31. As will be apparent hereinafter, the seal means 40 provides a fluid-tight seal between the members 22 and 31 during the entire time the members 22 and 31 are being moved from the first axial position thereof to the third axial position thereof so that no fluid leakage can occur during such movement whereas in the prior known coupling of the aforementioned copending patent application, Ser. No. 428,164, filed Sept. 29, 1982, fluid leakage is an expected condition when the members 22 and 31 are in the second axial position thereof.

Referring again to FIGS. 1-4 of the drawings the second cam means 37 comprises an annular cam surface 41 and the first cam means 36 comprises at least one cam lever 42 having a cooperating cam surface 43. The cam surface 43 is adapted to engage the annular cam surface 41 to provide the connecting and disconnecting of the coupling members 22 and 31.

The adapter member 31 of this example of the invention is threadedly fastened around a tubular conduit 45 in the form of a rigid metal conduit which comprises the conduit system 21. The adapter member 31 is threadedly fastened in position by female threads 46 provided therein which are adapted to receive male threads 47 provided on the terminal outer end portion of the tubular metal conduit 45.

As previously mentioned, the second cam means 37 is operatively associated with the second tubular outer end 32 of the adapter member 31; and, in this example of the invention the second cam means 37 is provided as in integral part of the second tubular outer end 32. In particular, the cam means 37 is defined integrally in member 31 as a concave and radially outwardly facing annular cam surface which as stated above is designated by the reference numeral 41; however, for simplicity of presentation such cam surface 41 may also be referred to herein as cam surface 37 and/or cam means 37.

The first cam means 36 comprises a plurality of two cam levers each designated by the same reference numeral 50 as shown in FIG. 1; and, as best seen in FIGS. 5-10 for the top lever, each cam lever 50 has a convex cam surface 51. The convex cam surfaces 51 are respectively adapted to engage the concave cam surfaces 41 and cooperate therewith to provide the connecting and disconnecting movements of members 22 and 31.

The tubular outer end 32 of member 31 is adapted to be received concentrically within the tubular outer end 23 of member 22 about a common longitudinal axis 53 as shown in FIG. 1. The axis 53 defines a flow axis for the members 22 and 31 and, in particular, a flow axis for fluid flowing through or contained in the members 22 and 31 with such members in their connected position.

As seen in FIGS. 1-10, each of the cam levers 50 is detachably fastened by an associated pivot pin 54 in an associated cutout 55 in the coupler member 22 for pivoting movement about its pivot pin 54. Each pivot pin 54 is disposed substantially perpendicular to the axis 53. The exemplary coupling 20 utilizes a plurality of two cam levers 50 whereby two cutouts 55 and two pivot pins 54 are provided in the tubular outer end 23. The cutouts 55 are provided in outer end 23 at substantially diametrically opposed positions whereby the cam levers 50 are mounted by their pins 54 at the corresponding positions and a pair of aligned cylindrical bores (not shown) are provided in the outer end 23 on opposite sides of each cutout 55 for receiving associated ends of an associated pivot pin 54.

Referring again to FIG. 1, it is seen that each of the cam levers 50 has a handle 56 for movement thereof and such handle is disposed substantially along the coupler member 22 parallel to the axis 53 and inwardly of the tubular outer end 23. In this example, the handles 56 of the cam levers 50, in essence, overlie the seal 40 with the cam levers in their connected position.

The handles 56 are adapted to provide an opening force to disconnect the coupling members 22 and 31 and such opening force is provided by pivoting the handles about their pivot pins 54 toward the outer end 23 of the coupler member 22.

Figure 5:
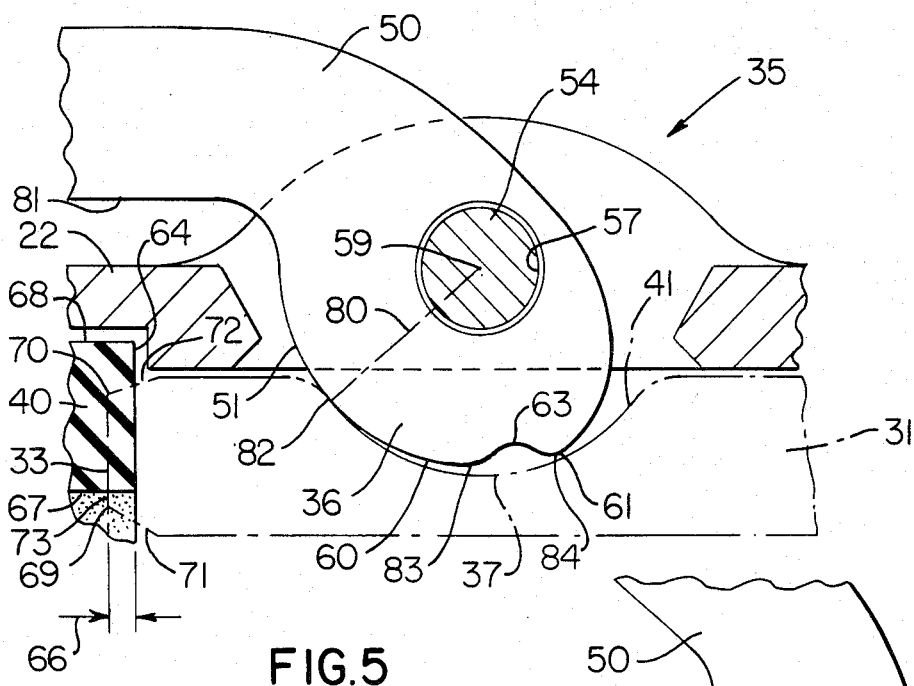
FIG. 5 is an enlarged fragmentary view of the upper portion of the coupler member illustrated in FIG. 1 with the fragmentary portion of the adapter member being shown in dash-dotted lines, FIG. 5 illustrating the cam lever in the fully closed position thereof wherein the coupler member and the adapter member are in their fully connected condition.

As will be readily apparent from FIG. 5 of the drawings each of the cam levers 50 has a cylindrical bore 57 for receiving an associated pivot pin 54 therethrough. The bore has a central axis 59 which defines a pivot axis for its cam lever 50. Each of the convex cam surfaces 51 comprises a smooth curved surface 60, an abrupt curved surface 61 disposed adjacent an end of the smooth curved surface and extending away from the pivot axis 59, and a transition surface 63 between the end of the smooth curved surface 60 and the abrupt curved surface 61.

Figure 6:
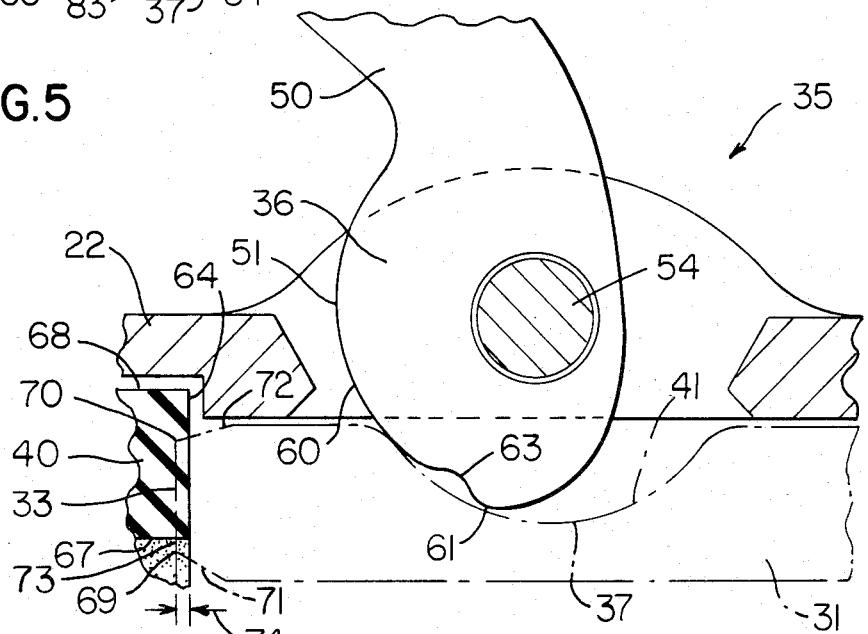
FIG. 6 is a view similar to FIG. 5 and illustrates the cam lever having been moved in an opening direction to a position just before the detent position of the cam lever is reached.
Figure 7:
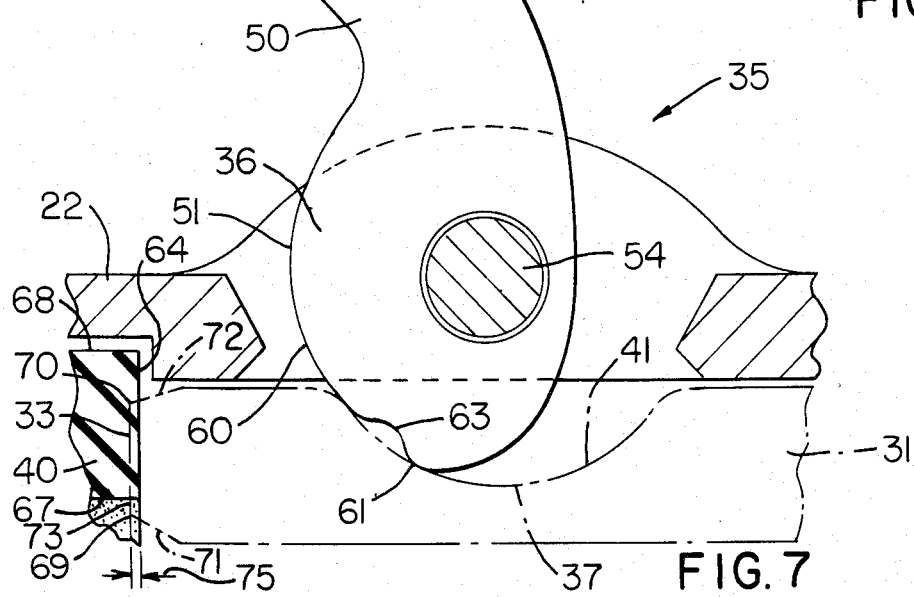
FIG. 7 is a view similar to FIG. 6 and illustrates the cam lever having been moved further in an opening direction from the position in FIG. 6 to the detent position thereof.

The smooth curved surface 60 is particularly adapted to engage a part of the annular concave surface 41, as illustrated in FIGS. 5-7, to provide an axial disconnecting or intermediate cam movement whereby the members 22 and 31 are moved away from each other from the first axial position thereof illustrated in FIG. 5 until a particular or second axial position, i.e., the position of FIG. 7 is reached. It should be noted that all of the uncoupling action or action to disconnect the coupling 20 is produced by moving or pivoting the outer ends of the cam levers 50 away from the axis 53.

The sealing surfaces 24 and 33 respectively of the coupler member 22 and the adapter member 31 and the thickness and resiliency of the seal means 40 is so selected that when the members 22 and 31 are in the fully connected or first axial position as illustrated in FIGS. 1 and 5, the flat end surface 33 of the adapter member 31 is sufficiently compressed into the facing side 64 of the seal member 40 that the seal member 40 is axially compressed between the opposed sides 64 and 65 thereof by an amount represented by the reference numeral 66 in FIG. 5. In this manner, the compressed sealing means 40 between the surfaces 24 and 33 of the respective members 22 and 31 has a compressive force that tends to separate the members 22 and 31 from each other and this compressive force maintains a fluidtight seal between the sealing surfaces 24 and 33.

The sealing means 40 comprises an annular seal member having the opposed flat faces 64 and 65 and an inner annular axial surface 67 and an outer annular axial surface 68.

The flat end surface 33 of the adapter member 31 has an inside annular edge 69 and an outside annular edge 70, the annular edges 69 and 70 of the adapter member 31 being respectively defined by angled or beveled surfaces 71 and 72 as illustrated in FIG. 5.

In this example, the end surface 33 of the adapter member 31 is so arranged relative to the annular seal member 40 that the inner annular edge 69 thereof is disposed inboard of the inner annular axial surface 67 of the seal member 40 while the outer annular edge 70 of the surface 33 is disposed outboard of the inner annular axial surface 67 of the seal member 40 while being disposed inboard of the outer annular axial surface 68 of the seal member 40 as illustrated in FIG. 5.

In this manner, the lower portion 73 of the flat end surface 33 of the adapter member 31, as well as the lower angled surface 71 thereof, can be subjected to pressure within the conduit system 21 that tends to separate the members 21 and 31 from eachother and such pressure acting on the portion 73 of the end surface 33 and angled surface 71 in addition to the primary pressure acting against the entire area of the inside surface 67 of the seal 40 provides the "feel" to the operator who is attempting to open the cam members 50 beyond the position illustrated in FIG. 7 that fluid pressure still exists in the system 21 which must be relieved before the coupling 20 is completely opened. However, the adapter 31 could be designed so that such "feel" would be provided only by the fluid pressure acting on the inside surface 67 of the seal 40, if desired.

During the aforementioned opening movement of the cam levers 50 from the position illustrated in FIG. 5 to the position illustrated in FIG. 7, only the cam surface 60 of each cam lever 50 is engaging the respective cam surface 41 of the adapter member 31 and this permits the axial movement between the coupler member 22 and the adapter member 31 to be in a disconnecting direction from the first axial position thereof illustrated in FIG. 5 to the second axial position thereof illustrated in FIG. 7. During such axial movement of the members 22 and 31 in a disconnecting direction from the first axial position illustrated in FIG. 5 to the second axial position illustrated in FIG. 7, the end surface 33 of the adapter member 31 is still compressed into the surface 64 of the seal member 40, but with a progressively decreasing amount as respectively represented by the arrows 74 and 75 in FIGS. 6 and 7 so that a fluid-tight seal is still provided between the members 22 and 31 by the seal means 40 even though the compressive force of the seal member 40 between the sealing surfaces 24 and 33 progressively decreases from the first axial position of the members 22 and 31 as illustrated in FIG. 5 to the second axial position of the members 22 and 31 as illustrated in FIG. 7.

When the levers 50 are disposed in the position illustrated in FIG. 7, each lever 50 for the first time has both the smooth surface 60 and the abrupt surface 61 thereof respectively engaging the cam surface 41 of the adapter member 31 and this position is referred to as the "detent" position of the cam levers 50.

Figure 8:
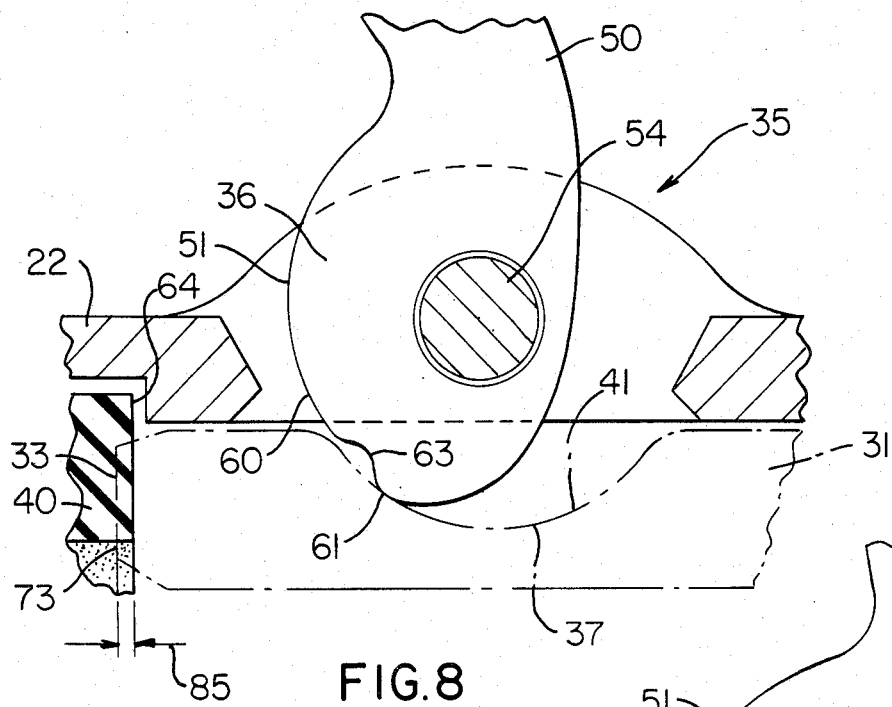
FIG. 8 is a view similar to FIG. 7 and illustrates the cam lever having been moved further in an opening direction beyond the detent position.
Figure 9:
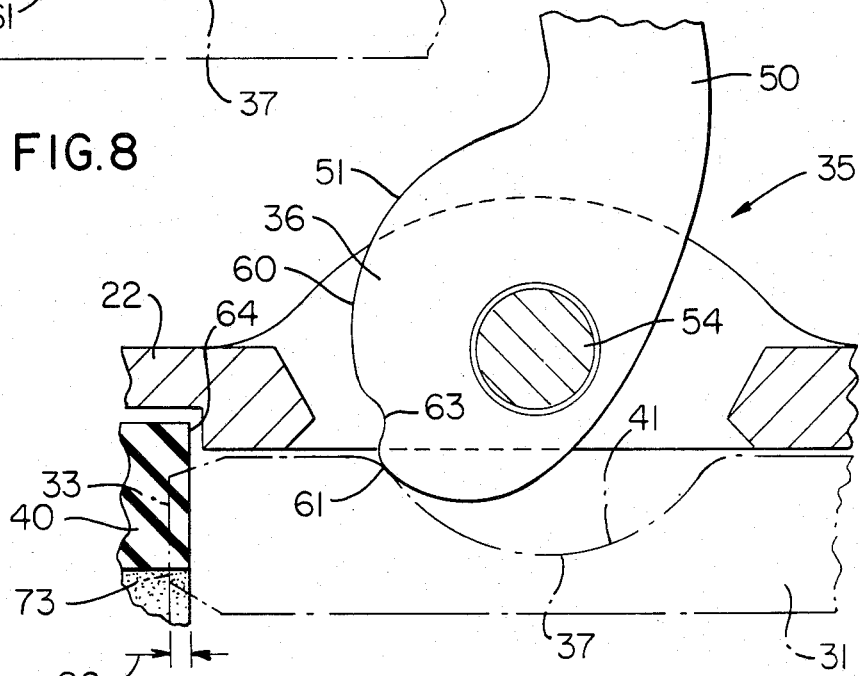
FIG. 9 is a view similar to FIG. 8 and illustrates the cam lever further moved in an opening direction from the position illustrated in FIG. 8.

Thus, any further opening movement of the cam levers 50 from the position illustrated in FIG. 7 now causes the abrupt surface 61 of each cam lever 50 to act on the respective cam surface 41 of the adapter 31 and the surface 60 thereof to be spaced therefrom, as illustrated in FIG. 8, the abrupt surface 61 being so constructed and arranged that the same causes the disconnecting movement between the members 22 and 31 to be reversed and become an incremental axial connecting movement of the members 22 and 31 toward each other whereby the annular seal member 40 is being progressively compressed between the surfaces 33 and 24 of the members 31 and 22 until a third axial position between the members 22 and 31 is reached as illustrated in FIG. 9. During such movement of the cam levers 50 from the second axial position of the members 22 and 31 to the third axial position of the members 22 and 31, the force of the seal means 40 tending to separate the members 22 and 31 progressively increases and is felt by the operator moving the cam levers 50. In addition, should there be fluid pressure in the conduit system 21, this fluid pressure is acting on the inside surface 67 of the seal 40 as well as on the portion 73 of the end surface 33 and the angled surface 71 of the adapter member 31 to tend to move the same in a separating or disconnecting direction from the coupler member 22. This fluid force in combination with the force required to further compress the seal member 40 gives the "feel" to the operator that fluid pressure is still in the system 21 and that he must reverse the direction of the movement of the levers 50 back to the closed position thereof as illustrated in FIG. 1 in order to relieve the pressure in the system 21 before again attempting to disconnect the members 22 and 31.

Figure 3:
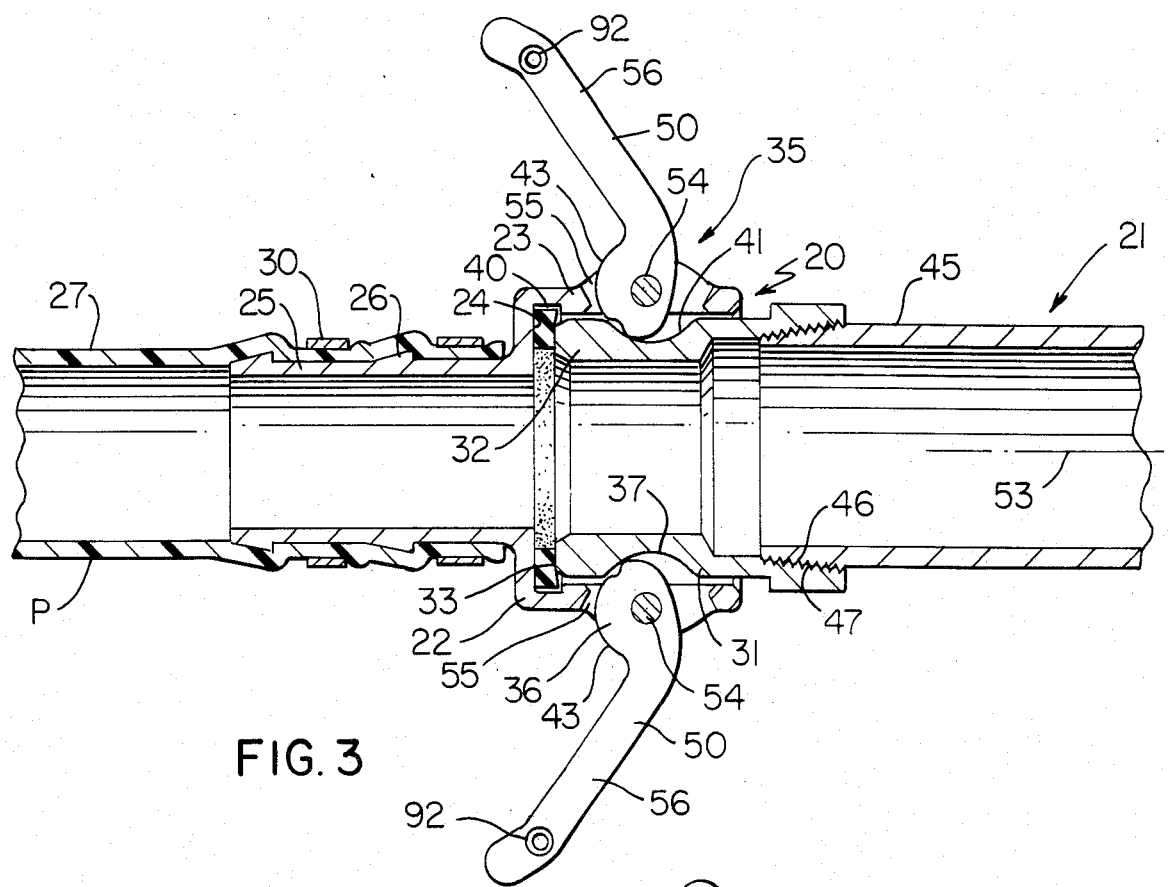
FIG. 3 is a view similar to FIG. 2 and illustrates the cam levers having been further moved in an opening direction beyond the detent position thereof.

Thus, it can be seen that no fluid leakage takes place during such operation of the cam levers 50 so that if fluid pressure exists in the system 21, the levers 50 can be moved back to the closed position thereof fairly rapidly as it is only when the cam levers 50 are further moved in an opening direction slightly beyond the position illustrated in FIG. 7 that the operator detects this increased pressure in the system tending to separate the members 22 and 31 and can rapidly close the levers 50 because the levers 50 have the handle ends 56 thereof disposed in the position illustrated in FIG. 3 which angle readily permits the same to be brought to a parallel position to the flow axis 53 as illustrated in FIG. 1.

Also, it has been found that when the cam levers 50 are disposed in the detent position illustrated in FIG. 7 wherein both of the cam surfaces 60 and 61 of each cam lever are engaging the respective cam surface 41 of the adapter member 31, any vibrations of the coupling system 21 will not cause the cam levers 50 to further open because of the resistance provided by the sealing means 40 which has its compressed condition further increased should the members 50 be moved in a further opening direction whereby it is believed that the cam levers 50 are substantially vibration resistant in the detent position illustrated in FIG. 7 as it takes a relatively large force to further move the cam levers 50 from the position illustrated in FIG. 7 in an opening direction beyond the position illustrated in FIG. 7 particularly should a fluid pressure exist in the system 21 as such further opening movement of the levers 50 causes axial movement of the members 22 and 31 toward each other in opposition to the separating force of the fluid pressure.

Figure 4:
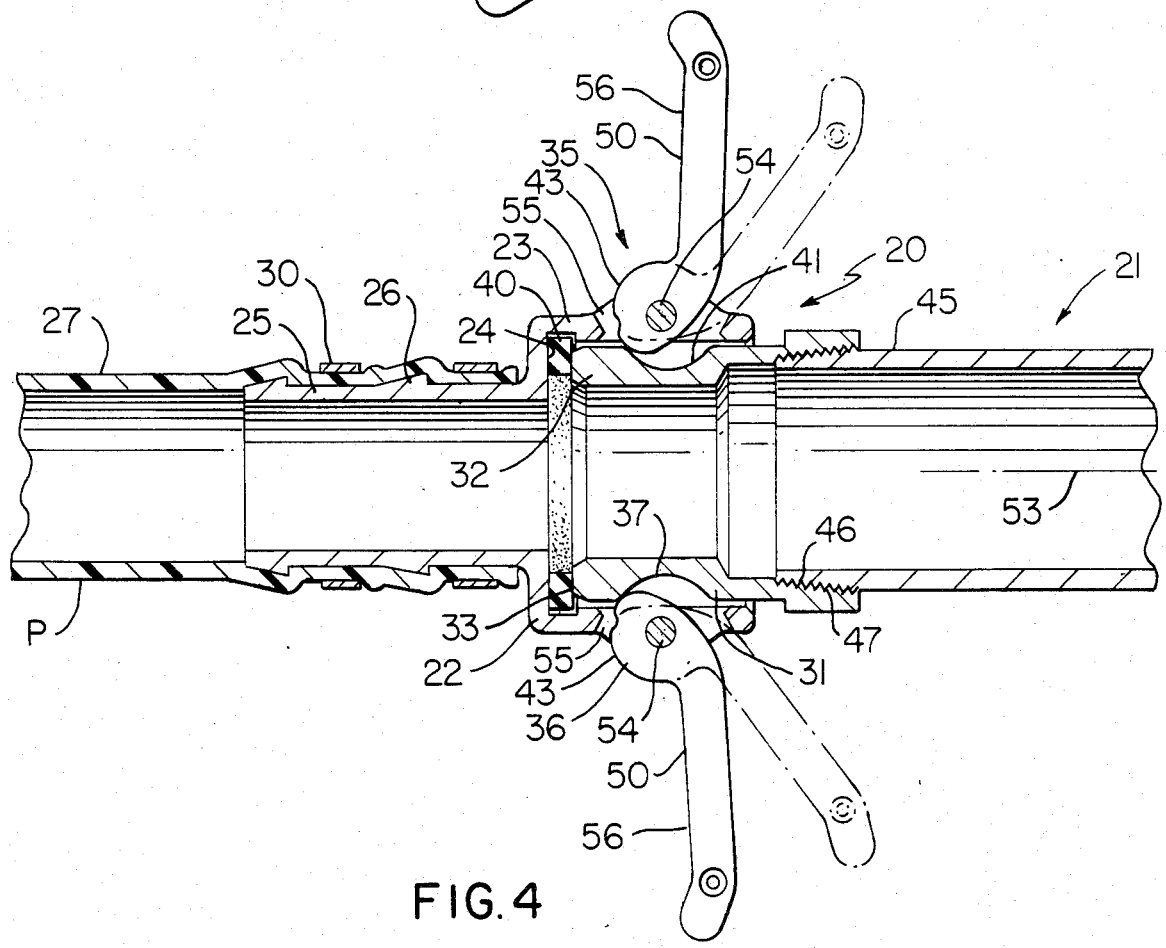
FIG. 4 is a view similar to FIG. 3 and illustrates in full lines the cam levers having been further moved in an opening direction to a position wherein the sealing gasket means of the coupling is no longer under fluid-tight sealing relation thereof, FIG. 4 illustrating in dash-dotted lines the position of the cam levers which permit the adapter member to be readily untelescoped from the coupler member.
Figure 10:
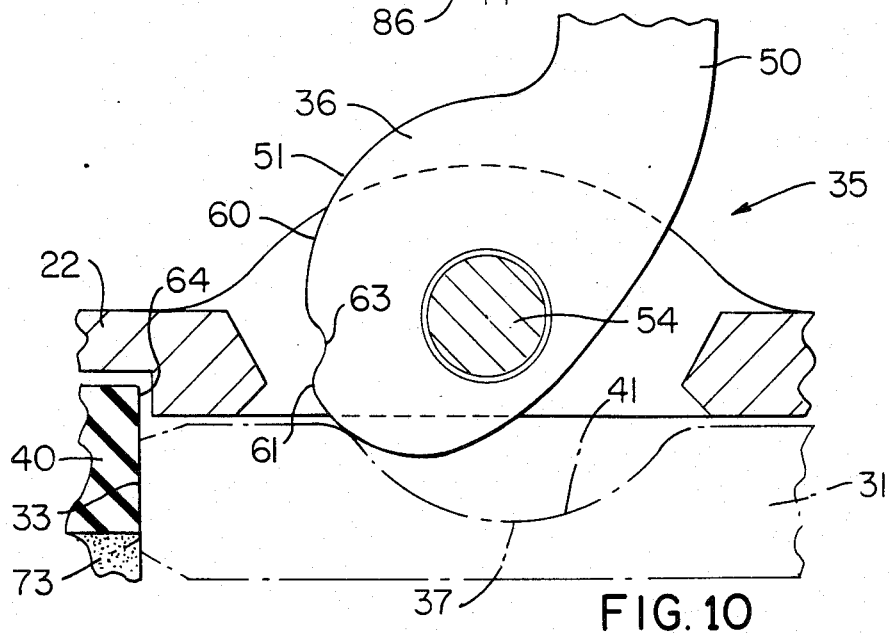
FIG. 10 is a view similar to FIG. 9 and illustrates the cam lever further moved in an opening direction thereof from the position in FIG. 9 to a position where the sealing gasket means is no longer under axial compression.

However, should the operator when moving the cam levers 50 in an opening direction beyond the position illustrated in FIG. 7 detect that no fluid pressure exists in the system 21 and that the opposing force is merely the compressive force of the seal means 40 being further compressed as the cam levers 50 are being pivoted further in an opening direction until the third axial position between the members 22 and 31 is reached, further pivoting of the cam levers 50 in an opening direction from the position illustrated in FIG. 9 now moves the members 22 and 31 in a disconnecting direction and the seal means 40 becomes progressively less compressed as represented by FIG. 10 where the seal means 40 is no longer under compression and further opening movement of the cam levers 50 to the dash-dotted position of FIG. 4 completely moves the cam surfaces 61 to a position that permits the adapter member 31 to be completely untelescoped from within the open end 23 of the coupler member 22 as is well known in the art.

Thus, it can be seen that each cam lever 50 has two distinct cam surfaces 60 and 61 which respectively act on their respective cam surface 41 in such a manner that as the cam surface 60 is acting thereon when the cam levers 50 are moved from the first axial position of the members 22 and 31 in FIG. 5 to the second axial position thereof as illustrated in FIG. 7, such movement is relatively easy as the members 22 and 31 are being separated from each other. However, at the position of FIG. 7 any further opening movement of the cam levers 50 cause the cam surfaces 61 to act on the respective cam surfaces 41 to move the members 22 and 31 axially toward each other in opposition to the force not only of the sealing means 40 but also in opposition to the separating force of any fluid pressure existing in the system 21 so that even if the cam levers 50 should vibrate from the closed position of FIG. 5 to the detent position of FIG. 7, further vibration thereof will not open the cam levers 50 because of the resistance to such movement by the compressive force of the sealing means 40 which is a much greater force opposing such opening movement than has been encountered from moving the cam members 50 from the position of FIG. 5 to the position of FIG. 7.

In addition, should there be pressure in the system 21, the operator feels such further force on the cam members 50 when he attempts to move the same further from the position illustrated in FIG. 7 toward the position illustrated in FIG. 8 whereby the operator will close the cam levers 50 upon the "feeling" of pressure in the system 21 for the reasons previously set forth.

Therefore, it can be seen that the coupling 20 of this invention can be made of relatively few parts in a unique manner according to the method of this invention to operate in a manner now to be described.

With the cam levers 50 disposed in the dash-dotted line position illustrated in FIG. 4, the adapter member 31 is adapted to be telescoped into the end 23 of the coupler member 22 and the cam levers 50 are adapted to be rotated with their handle portions 56 to the position illustrated in FIG. 1 wherein the handle portions 56 are diposed substantially parallel to the longitudinal axis 53 of the system 21 whereby first the cam surfaces 61 and then the cam surfaces 60 of the cam levers 50 operate to force the adapter 31 and the coupling member 22 axially together to the fully connected position thereof illustrated in FIGS. 1 and 5 wherein the end surface 33 of the adapter member 31 is fully compressed into the surface 64 of the sealing member 40 to provide a fluid-tight seal therebetween. For example, in one embodiment of the coupling 20 of this invention the end surface 33 is compressed into the seal means 40 approximately 0.062 of an inch when the cam levers 50 are disposed in their 90° position illustrated in FIGS. 1 and 5.

Figure 2:
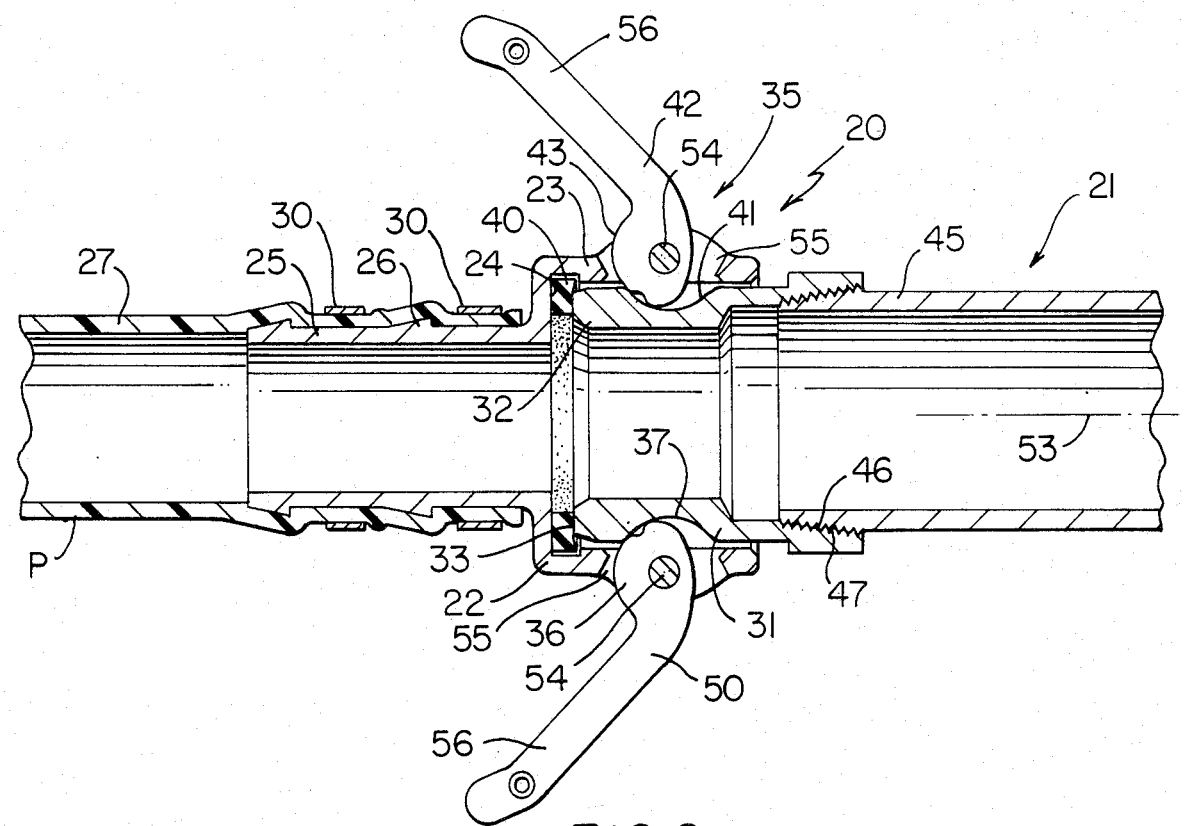
FIG. 2 is a view similar to FIG. 1 and illustrates the cam levers of the coupling having been moved in an opening direction thereof to a detent position thereof.

When it is desired to uncouple the members 22 and 31, the operator rotates the cam levers 50 about their pivot pins 54 from the position illustrated in FIG. 1 toward the position illustrated in FIGS. 2 and 7 whereby the action of the cam surfaces 60 on the cam surface 41 permit the members 22 and 31 to be moved from the first axial position illustrated in FIG. 5 to the axial position illustrated in FIG. 7 wherein the sealing means 40 remains in a compressed condition to provide a fluid-tight seal. For example, in the previously described embodiment of a coupling 20 of this invention, the end surface 33 is compressed approximately 0.016 of an inch into the seal means 40 when the cam levers 50 are disposed in their approximately 44° position illustrated in FIGS. 2 and 7.

As previously stated, the position of FIG. 7 is referred to as the pressure lock or pressure detent position, and at this position the disconnecting movement, i.e., movement to disconnect the coupling 20 is reversed whereby further movement of the outer ends of the cam levers 50 starts what has been referred to as an incremental axial connecting movement. During this incremental connecting movement instead of the members 22 and 31 being further disconnected they are actually moved axially in a connecting manner toward each other and thus are subject to a reverse cam action. During this reverse cam action the sealing surfaces 24 and 33 move closer together and further compress the sealing member 40 therebetween as previously described. The approximate conclusion of the reverse cam action is shown in FIG. 9 and with movement of the cam levers 50 to positions slightly beyond the position shown for the top lever 50 in FIG. 9, the members 22 and 31 may be completely disconnected and moved apart in the usual manner.

The incremental connecting movement is provided by the abrupt curved surface 61 of each cam lever 50 engaging another part of the respective cam surface 41 to provide the incremental connecting movement in opposition to the opposing force of the seal means 40 being further compressed. For example, in the previously described coupling 20 of this invention the surface 33 is compressed into the seal means 40 approximately 0.039 of an inch with the levers 50 being disposed at approximately 15° and in the position illustrated in FIG. 9 where the members 22 and 31 are in their third axial position.

However, in the event fluid under pressure is provided in the conduit system 21, with the members 22 and 31 connected as illustrated in FIG. 7, the incremental connecting movement provided by the cam means 35 and in particular the incremental connecting movement provided by the abrupt curved surface 61 engaging the annular surface 41 is subjected additionally to resistance by any fluid under pressure contained within the conduit system 21.

This fluid resistance is transmitted through the cam means 35 to the handles 56 of the cam levers 50 and serves to impede the incremental movement from the position of FIG. 7 to the position of FIG. 8, and slightly beyond, by resisting the opening force applied against the handles 56 of the cam levers 50. The opposing fluid force is detectable and once detected serves as a warning that the pressure in the system 21 must be relieved before completely disconnecting the members 22 and 31. As previously stated, the angular position of the handles 56 of the levers 50 in the position of FIG. 7 readily permits reclosing of the levers 50 to the position of FIG. 5.

To make possible the movement described above, each of the convex cam surfaces 51 has the smooth curved surface 60 thereof disposed relative to the pivot axis 59 which gradually decreases in dimension or radius 80 in a direction away from the inside surface 81 of its handle 56. This dimensional construction for surface 60 corresponds roughly to similar constructions of prior art couplings. Thus, it is seen that the smooth curved surface 60 decreases in radius 80 from pivot axis 59 with angular displacement of the radius from point 82 to point 83 on the surface 60 as illustrated in FIG. 5.

In the example of the invention the abrupt surface 61 of each cam surface 51 has an outer portion 84 which comprises a part of a first right circular cylindrical surface and the transition surface 63 comprises a part of a second right circular cylindrical surface and blends smoothly with the smooth curved surface 60 and the abrupt surface 61. The convex cam surfaces 51 with their cooperating surface portions comprising same as described herein make possible the unique action of the cam levers 50. Further, the operation of such cam levers is a smooth operation.

However, the coupling 20 of this invention is basically a safe coupling due to the unique manner in which there is a resistance or opposing force to the usual uncoupling action which opposing forces occurs if pressure is present in the system 21 using the coupling 20. The resistance or opposing force required that additional work be done beyond the normal work required to normally disconnect the coupling 20 whereby the opening force must be increased in magnitude by an amount to enable further disconnecting movement from the position of FIG. 7 to the position of FIG. 9 and slightly beyond. This need to increase the opening force is obviously detectable.

Each of the cam levers 50 may be of any suitable construction; however, preferably in this example each lever 50 with its convex surface 51 is defined as a single-piece structure and preferably made of a suitable metallic material. In addition, the members 22 and 31 and pivot pins 54 are also preferably made of a suitable metal.

The seal means or annular seal 40 may be made of any suitable material known in the art which is compatible with the pressurized fluid being conveyed in the conduit system 21. Preferably the seal 40 is made of a compressible resilient elastomeric material.

In this disclosure a pluirality of two cam levers 50 comprise the coupling 20 and each is provided with a convex cam surface 51 which is in turn defined by a plurality of cooperating surfaces. However, it is to be understood that a plurality of more than two cam levers may be provided if desired.

The quick connect-disconnect coupling 20 is described as being for fluid conduit means which in this example is in the form of a fluid conduit system 21. However, it is to be understood that the coupling 20 may be provided in association with conduit means in the form of a tank or pressure vessel, a vent system, a fluid conduit system having fluid conveying conduits and the fluid contained in these components may be a gaseous fluid, a liquid, a combination or mixture of a liquid and a gas, a gas containing solid particles, a liquid containing solid materials (such as a slurry), or the like.

The fluid under pressure is detectable by increased resistance to manual opening movements of the cam levers 50 in moving from the position of FIG. 7 through the positions of FIGS. 8 and 9. Thus, an operator will sense or detect that to move from the position of FIG. 7 to the position of FIG. 8, for example, a greater opening force is required over the amount normally needed to further compress the sealing means 40 by the amount represented by the arrow 85 in FIG. 8 and the arrow 86 in FIG. 9. This manual detection serves as a warning to the operator whereby such operator is then in a position to relieve the pressure using any means or technique known in the art before disconnecting the coupling 20.

The opposing force or resistance to movement increases as the effective flow area through the members 22 and 31 increases. Thus, for an effective flow area equivalent to less than an inch in diameter, a particular opposing force would be transmitted which would have to be overcome by an increased force in the event a substantial pressure is present in the conduit system. However, as the above-mentioned flow area increases substantially and even with a modest pressure in the associated system 21, the opening force becomes so great that any reverse incremental connecting movement is more difficult using manual means whereby the coupling 20 literally becomes a self-controlled and self-contained safe coupling.

It will be appreciated that the above features are made possible due to fluid pressure in the conduit system acting on the unique cam means 35 of this invention. In addition, there are no special operating procedures for the cam levers 50 or special fastening requirements. Instead, the cam levers 50 are operated in a similar manner as prior art cam levers, yet such cam levers 50 and other members of the cam means 35 provide the previously described action.

The adapter member 31 with its tubular outer end 32 and annular cam means or annular cam surface 41 is basically a standard construction which is well known in the art and does not vary substantially from one manufacturer to another. However, the coupler member 22 does vary from manufacturer to manufacturer and indeed it is important that the coupler member 22 be constructed with its cam levers 50 provided with unique cam surfaces 51 so as to provide the cam movement previously described.

To assure that the coupling 20 operates in a desired manner it is important that the distance between the two cam arm pivot pins 54 be held within a precisely controlled dimensional tolerance. In addition, the location of the two cam arm pivot pins 54 and in particular the distance of each axis 59 from the sealing surface 24 must be within a close predetermined tolerance range. Finally, the axial thickness of the seal 40 and dimensional disposition of the sealing surface 33 with the adapter member 31 connected in position must be maintained with precise dimensional tolerances.

Thus, it is clear that the coupling 20 of this invention is of simple and economical construction yet is essentially a safe coupling due to the unique manner in which, with the coupling installed in position in an associated system, fluid pressure may be readily detected by an operator without having a fluid leakage condition as in the coupling of the aforementioned copending patent application, Ser. No. 428,164, filed Sept. 29, 1982.

The coupling 20 of this invention does not require special latches, does not utilize complex interlocks, and does not require hitch pins, or the like. With respect to these items, it is well known that prior art couplings of this type which utilize latches, interlocks, and hitch pins cannot operate normally and thus in providing increased safety introduce what may be considered nuisance characteristics. However, the coupling device 20 of this invention is free of any nuisance characterictics and operates in a similar manner as simple prior art couplings.

The quick connect-disconnect coupling of this invention is also constructed so that it is not necessary to touch or move the cam levers 50 to enable easy entry of the adapter member 31 within the coupler member. For example, initial entry of the adapter member 31 within the coupler member 22 with the associated position of a pair of cam levers provided on the coupler member even being in the closed condition of FIG. 1 is permissible because the cam levers 50 will be moved by the beveled edge 72 of the adapter member 31 engaging the cam levers 50 and pivoting some about their pivot pins 54 to the dash-dotted position of FIG. 4.

When the sealing surface 33 is urged against the seal 40 sandwiching same against sealing surface 24, the cam levers 50 are then moved manually toward the coupler member 22 to their fully coupled position which as mentioned before is shown in FIGS. 1 and 5. In this latter position the portions 60 of the cam surfaces 51 engage the cam surfaces 41 to provide the coupled or fastened position of the coupling 20.

Each cam lever 50 of the coupling 20 is provided with an opening or hole 92 in the end of its arm 56. Each hole 92 is normally for the purpose of attaching a conventional opening ring thereto and may also be used for fastening the arm against movement once the coupling is connected or fastened in its coupled position of FIG. 1 by passing a fastening wire, or the like, therethrough.

The cam levers 50 of the coupling 20 operate in a similar manner whether the fluid in the conduit system is a compressible fluid such as air or a non-compressible fluid such as a liquid.

In this disclosure of the invention reference is made to cam means 35 comprising a first cam means 36 operatively associated with or on the coupler member 22 and a second cam means 37 operatively associated with the adapter member 31. However, it will be appreciated that the cam means 36 and 37 may be modified, reversed, and provided on the adapter member 31 and coupler member 22 respectively by suitably modifying the adjoining structure provided that such cam means still operate in the manner described in detail herein.

The above description has used terms such as top, upper, outer, inner and the like. However, it is to be understood that these and similar terms merely refer to components as shown in the drawings and are not to be considered limiting in any way.

While a present preferred embodiment of this invention, and method of making the same, have been illustrated and described as required by the Patent Statute, it will be recognized that this invention may be otherwise variously embodied and practiced within the scope of the following claims.

What is claimed is:

1. In a quick connect-disconnect coupling for fluid conduit means comprising, a coupler member adapted to be connected in said conduit means and having a first tubular outer end and a first sealing surface, an adapter member adapted to be connected in said conduit means and having a second tubular outer end and a second sealing surface, said second tubular end being adapted to be received within said first tubular end, cam means for connecting and disconnecting said members comprising first cam means carried by said first tubular end and second cam means carried by said second tubular end, and seal means disposed between said sealing surfaces for providing a fluid-tight seal between said members with said first and second cam means connected and with said members in a first axial position thereof, said first and second cam means respectively having cam surfaces, one of said first and second cam means being movable relative to its respective tubular outer end in one direction of continuous opening movement thereof from a fully connected position of its said cam surface with said cam surface of the other of said first and second cam means with said members in said first axial position thereof to a fully disconnected position of said cam surfaces so that said members can be completely disconnected from each other, said cam surfaces of said first and second cam means acting against each other during disconnection of said members as said one cam means is being continuously moved through said opening movement thereof to provide an axial disconnecting movement of said members from said first axial position thereof until a particular second axial position thereof is reached at which second axial position the disconnecting movement of said members is reversed and becomes an incremental axial connecting movement for a predetermined increment to a third axial position of said members before allowing said members to be completely disconnected whereby in the event fluid under pressure is present in said conduit means having said members connected therein said incremental connecting movement of said members is subjected to resistance by said fluid under pressure, said resistance being transmitted through said members as an opposing force which serves to impede said incremental movement by resisting any opening force applied to said one cam means, said opposing force being detectable and once detected serves as a warning that the pressure of said fluid under pressure must be relieved before completely disconnecting said members, the improvement wherein said seal means provides said fluid-tight seal between said members during the entire time said members are being moved from said first axial position thereof to said third axial position thereof and thereby is adapted to transmit at least part of said opposing force to said members.

2. A coupling as set forth in claim 1 wherein said seal means is resilient and is axially compressed between said sealing surfaces of said members during said entire time said members are being moved from said first axial position thereof to said third axial position thereof whereby said seal means provides a tending to separate compressive force between said members during said entire time.

3. A coupling as set forth in claim 2 wherein said compressive force of said seal means decreases as said members are being moved from said first axial position thereof to said second axial position thereof.

4. A coupling as set forth in claim 3 wherein said compressive force of said seal means increases as said members are being moved from said second axial position thereof to said third axial position thereof.

5. A coupling as set forth in claim 2 wherein said seal means comprises an annular member having an inside axial surface and an outside axial surface, said second sealing surface being annular and having an inside annular edge and an outside annular edge, said inside annular edge of said second sealing surface being inboard of said inside axial surface of said seal means and said outside annular edge being disposed outboard of said inside axial surface.

6. A coupling as set forth in claim 5 wherein said outside annular edge of said second sealing surface is inboard of said outside axial surface of said seal means.

7. A coupling as set forth in claim 1 wherein said cam surface of said second cam means comprises at least one concave radially outwardly facing annular cam surface and said first cam means is said one cam means and comprises at least one cam lever having said cam surface of said first cam means as a convex cam surface which is adapted to engage said annular cam surface to provide said connecting and disconnecting of said members.

8. A coupling as set forth in claim 7 wherein said convex cam surface comprises a smooth curved surface, an abrupt curved surface defined by an abrupt projection adjacent an end of said smooth curved surface, and a transition surface between said end of said smooth curved surface and said abrupt curved surface, said smooth curved surface engaging a part of said annular concave surface to provide said disconnecting movement and said abrupt curved surface engaging another part of said annular concave surface to provide said incremental connecting movement.

9. A coupling as set forth in claim 8 wherein said smooth curved surface and said abrupt curved surface respectively engage said annular curved surface only when said members are in said second axial position thereof.

10. A coupling as set forth in claim 9 wherein said seal means is resilient and is axially compressed between said sealing surfaces of said members during said entire time said members are being moved from said first axial position thereof to said third axial position thereof whereby said seal means provides a tending to separate compressive force between said members during said entire time, said compressive force of said seal means decreasing as said members are being moved from said first axial position thereof to said second axial position thereof, said compressive force of said seal means increasing as said members are being moved from said second axial position thereof to said third axial position thereof.

11. In a method of making a quick connectdisconnect coupling for fluid conduit means comprising the steps of, providing a coupler member adapted to be connected in said conduit means and having a first tubular outer end and a first sealing surface, providing an adapter member adapted to be connected in said conduit means and having a second tubular outer end and a second sealing surface, said second tubular end being adapted to be received within said first tubular end, providing cam means for connecting and disconnecting said members which comprise first cam means carried by said first tubular end and second cam means carried by said second tubular end, providing seal means disposed between said sealing surfaces for providing a fluid-tight seal between said members with said first and second cam means connected and with said members being in a first axial position thereof, forming said first and second cam means to respectively have cam surfaces, and forming one of said first and second cam means to be movable relative to its respective tubular outer end in one direction of continuous opening movement thereof from a fully connected position of its said cam surface with said cam surface of the other of said first and second cam means with said members in said first axial position thereof to a fully disconnected position of said cam surfaces so that said members can be completely disconnected from each other, said step of providing said cam means comprising the step of providing said cam surfaces of said first and second cam means to act against each other during disconnection of said members as said one cam means is being continuously moved through said opening movement thereof to provide an axial disconnecting movement of said members from said first axial position thereof until a particular second axial position thereof is reached at which second axial position the disconnecting movement of said members is reversed and becomes an incremental axial connecting movement for a predetermined increment to a third axial position of said members before allowing said members to be completely disconnected whereby in the event fluid under pressure is present in said conduit means having said members connected therein said incremental connecting movement of said members is subjected to resistance by said fluid under pressure, said resistance being transmitted through said members as an opposing force which serves to impede said incremental movement by resisting any opening force applied to said one cam means, said opposing force being detectable and once detected serves as a warning that the pressure of said fluid under pressure must be relieved before completely disconnecting said members, the improvement wherein said steps of providing causes said seal means to provide said fluid-tight seal between said members during the entire time said members are being moved from said first axial position thereof to said third axial position thereof whereby said seal means is adapted to transmit at least part of said opposing force to said members.

12. A method as set forth in claim 11 wherein said seal means is resilient and said steps of providing causes said seal means to be axially compressed between said sealing surfaces of said members during said entire time said members are being moved from said first axial position thereof to said third axial position thereof whereby said seal means provides a tending to separate compressive force between said members during said entire time.

13. A method as set forth in claim 12 wherein said steps of providing causes said compressive force of said seal means to decrease as said members are being moved from said first axial position thereof to said second axial position thereof.

14. A method as set forth in claim 13 wherein said steps of providing causes said compressive force of said seal means to increase as said members are being moved from said second axial position thereof to said third axial position thereof.

15. A method as set forth in claim 12 and including the steps of forming said seal means to comprise an annular member having an inside axial surface and an outside axial surface, forming said second sealing surface to be annular and have an inside annular edge and an outside annular edge, forming said inside annular edge of said second sealing surface so as to be inboard of said inside axial surface of said seal means, and forming said outside annular edge so as to be disposd outboard of said inside axial surface.

16. A method as set forth in claim 15 and including the step of forming said outside annular edge of said second sealing surface so as to be inboard of said outside axial surface of said seal means.

17. A method as set forth in claim 11 wherein said step of providing cam means comprises the step of providing said cam surface of said second cam means to comprise at least one concave radially outwardly facing annular cam surface and said first cam means to be said one cam means and comprise at least one cam lever having said cam surface of said first cam menas be a convex cam surface which is adapted to engage said annular cam surface to provide said connecting and disconnecting of said members.

18. A method as set forth in claim 17 wherein said step of providing said cam means comprises the step of providing said convex cam surface to comprise a smooth curved surface, an abrupt curved surface defined by an abrupt projection adjacent an end of said smooth curved surface, and a transition surface between said end of said smooth curved surface and said abrupt curved surface, said smooth curved surface being adapted to engage a part of said annular concave surface to provide said disconnecting movement and said abrupt curved surface being adapted to engage another part of said annular concave surface to provide said incremental connecting movement.

19. A coupling a set forth in claim 18 wherein said step of providing said cam means causes said smooth curved surface and said abrupt curved surface respectively to engage said annular curved surface only when said members are in said second axial position thereof.

20. A method as set forth in claim 19 wherein said seal means is resilient and said steps of providing causes said seal means to be axially compressed between said sealing surfaces of said members during said entire time said members are being moved from said first axial position thereof to said third axial position thereof whereby said seal means provides a tending to separate compressive force between said members during said entire time, said steps of providing causing said compressive force of said seal means to decrease as said members are being moved from said first axial position thereof to said second axial position thereof, and said steps of providing causing said compressive force of said seal means to increase as said members are being moved from said second axial position thereof to said third axial position thereof.

* * * * *